(12) United States Patent  
Saubade

(10) Patent No.: US 8,807,291 B2  
(45) Date of Patent: Aug. 19, 2014

(54) ATTACHMENT SUPPORT FOR INSTALLING EQUIPMENT ON AIRCRAFT LANDING GEAR, USE OF SUCH AN ATTACHMENT SUPPORT AND ASSEMBLY COMPRISING A MONITORING DEVICE AND ONE SUCH ATTACHMENT SUPPORT

(75) Inventor: Frederic Saubade, Lege Cap Ferret (FR)

(73) Assignee: Blue Green Technology, Bordeaux (FR)

( * ) Notice: Subject to any disclaimer, the term of this patent is extended or adjusted under 35 U.S.C. 154(b) by 860 days.

(21) Appl. No.: 12/996,944

(22) PCT Filed: Jun. 9, 2009

(86) PCT No.: PCT/EP2009/057090  
§ 371 (c)(1),  
(2), (4) Date: Feb. 28, 2011

(87) PCT Pub. No.: WO2010/000575  
PCT Pub. Date: Jan. 7, 2010

(65) Prior Publication Data  
US 2011/0147151 A1    Jun. 23, 2011

(30) Foreign Application Priority Data

Jun. 10, 2008   (FR) ...................................... 08 53852

(51) Int. Cl.  
*B60T 3/00*   (2006.01)

(52) U.S. Cl.  
USPC ................................ 188/4 R; 188/32; 410/30

(58) Field of Classification Search  
USPC ...................................... 188/4 R, 32; 410/30  
See application file for complete search history.

(56) References Cited

U.S. PATENT DOCUMENTS

| | | | | |
|---|---|---|---|---|
| 2,461,248 A | * | 2/1949 | Wright | 188/32 |
| 2,522,328 A | * | 9/1950 | Wiswell et al. | 188/32 |
| 2,998,102 A | * | 8/1961 | Deverich | 188/32 |
| 3,811,536 A | * | 5/1974 | Haynes | 188/32 |
| 6,545,601 B1 | | 4/2003 | Monroe | |
| 6,725,979 B1 | * | 4/2004 | Snook | 188/32 |

FOREIGN PATENT DOCUMENTS

| | | |
|---|---|---|
| FR | 529235 A | 11/1921 |
| JP | 2001301577 A | 10/2001 |

OTHER PUBLICATIONS

International Search Report, dated Nov. 3, 2009, from corresponding PCT application.

* cited by examiner

*Primary Examiner* — Christopher Schwartz  
(74) *Attorney, Agent, or Firm* — Young & Thompson

(57) ABSTRACT

An attachment support for temporarily installing equipment on a wheel of an aircraft or a vehicle, includes:
two support elements connected by a shaft that together form a plane, the elements bearing respectively on the ground and against a tire of the wheel, with the elements extending along an axis parallel to the wheel axis, and
displacement members to place the support elements in a first inactive position in which they do not bear on the tire, and a second locked position, in which they bear on the tire to lock the wheel. The members include a lever arm having one end connected to the end of one U-shaped element, whose two arms are mounted in a rotary manner respectively on the ends of one of each support element, the lever arm being displaceable from a horizontal to a vertical position.

16 Claims, 3 Drawing Sheets

Figure 1:
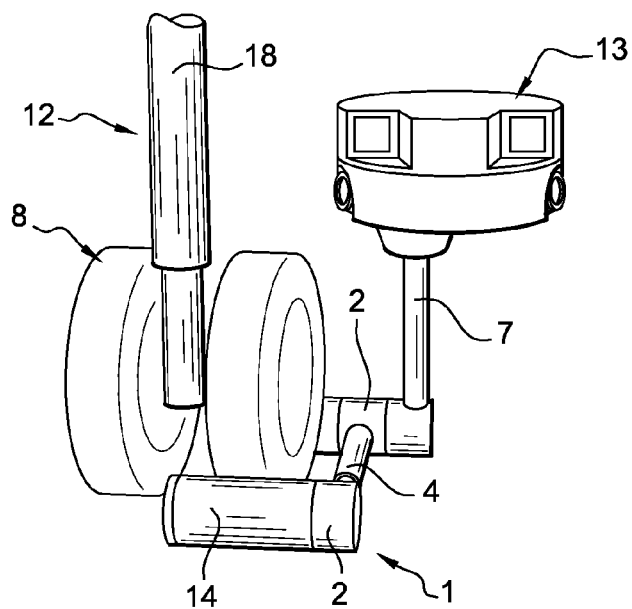

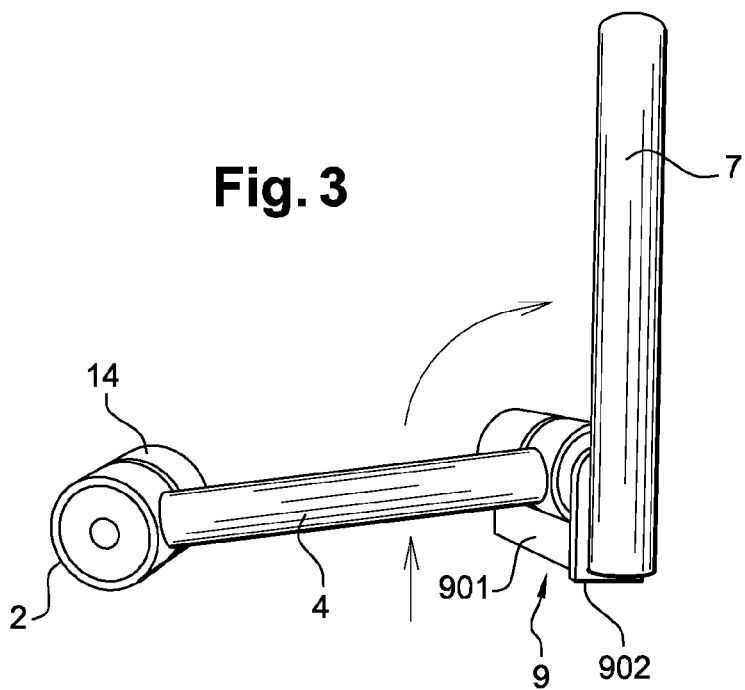
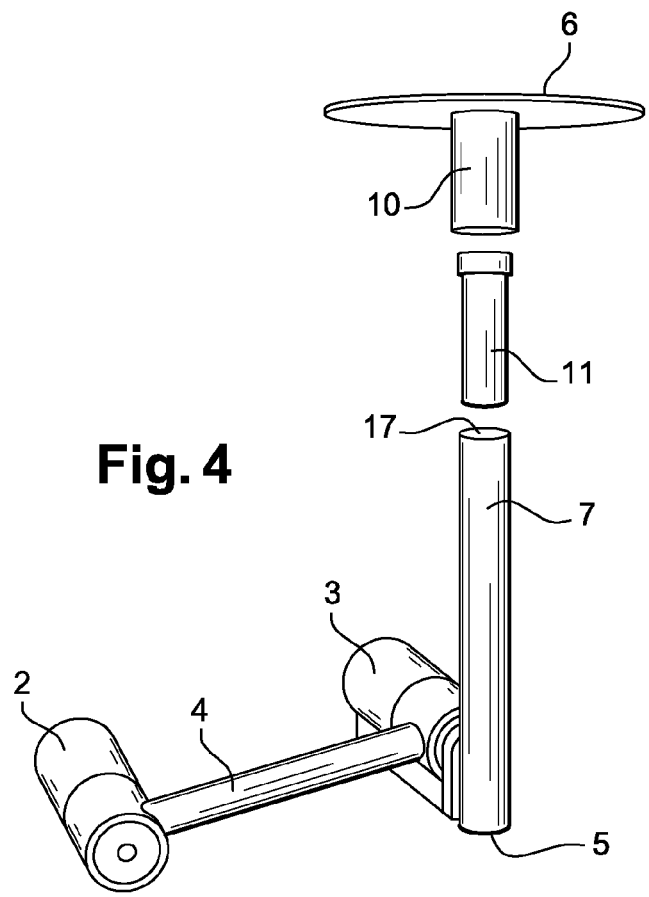

ATTACHMENT SUPPORT FOR INSTALLING EQUIPMENT ON AIRCRAFT LANDING GEAR, USE OF SUCH AN ATTACHMENT SUPPORT AND ASSEMBLY COMPRISING A MONITORING DEVICE AND ONE SUCH ATTACHMENT SUPPORT

BACKGROUND OF THE INVENTION

1. Field of the Invention

This invention relates to an attachment support for installing a piece of equipment on the landing gear of an aircraft, as well as a wheel-locking device that comprises such an attachment support. The invention also relates to an assembly that comprises a surveillance device and such an attachment support.

This assembly is particularly suitable for being mounted on a front landing gear of an aircraft, such as a civilian transport airplane, a military airplane, or a helicopter.

2. Description of the Related Art

Surveillance systems of an airplane are known when it is stopped, in particular when it is left without surveillance or is not under much surveillance for a certain length of time. In particular, for certain types of airplanes such as airplanes for humanitarian aid or the airplanes that are often brought into sensitive zones, these surveillance systems make it possible to prevent risks created by intrusions into an airplane, such as the theft of equipment on board the airplane, the theft of cargo, the installation of dangerous elements in the airplane such as a bomb, or even the insertion of stowaways onto the airplane.

Thus, when intruders have entered a previously defined security zone around the airplane or when one of the accesses of the airplane is open, the surveillance system is capable of detecting these intrusions, and then in a simultaneous manner, it stores the information in a memory unit so as to be able to reproduce it subsequently at the end of the surveillance and sends alarm signals to a surveillance center to report the detected intrusions by specifying in particular the number of intruders, and their location relative to the airplane. The operators of the surveillance center can then take the necessary and appropriate measures relative to the situation. In this way, it is therefore no longer necessary to use human surveillance in a permanent manner around the airplane. This surveillance is performed in a remote and centralized manner. The surveillance system can also simultaneously trigger an audible signal to make the intruders leave. The presence of such a surveillance system is also useful for deterring possible intrusions.

Surveillance systems with sensors are known from the prior art as a surveillance system. Such a surveillance system comprises an assembly of sensors that are arranged at strategic locations such as the openings of doors and different accesses to the interior of the airplane, such as flaps at the landing gears. These sensors are connected by a communication network to a surveillance center. Thus, when one of the sensors detects a change of state of the door or the access associated with this sensor, the sensor sends an alarm signal to the surveillance center. The primary drawback of this surveillance system is that it is limited only to the surveillance of the accesses and openings. A significant portion of the airplane—such as the engines placed under the wings or structural elements other than the doors and the accesses—is not covered by this type of surveillance system. Another technical problem that is posed relates to the inadequacy of the information collected and transmitted by such a surveillance system. Actually, the operators and/or the users that receive the information sent by the sensors only learn a change of state of the sensor-equipped zones on such and such a date and at such and such a time. They do not have access to information such as, for example, the number of intruders, and their location relative to the airplane.

Another known solution is to use a perimetric surveillance system. Such a surveillance system generally comprises a particular assembly of sensors that make it possible to detect the movement of an intruder, and to capture images. The arrangement of these sensors relative to one another is such that they make it possible to delimit a surveillance field around the airplane. The assembly comprises means for recording data and means that make it possible to transmit information to a surveillance center or other recipients. Thus, when an intruder crosses the barrier that delimits this space, an alarm signal is produced. The surveillance system also comprises supply means such as a battery for the different electronic components that constitute the surveillance system. In the prior art, such an assembly is installed on the airplane, and more specifically on the body of the fuselage. It is in inactive position when the airplane is in flight, and it is in operating position when the airplane is stopped.

So as not to be subject to an authentication request in the same way as the other elements of the airplane, the installation of the assembly on the airplane is passive. Passive installation is defined by an installation where the different elements of the assembly are independent of the airplane and where it does not generate interference with the operation of the airplane when the airplane is in flight. Thereby, a portion of the elements that need access to the outside is contained in a type of housing that is attached to the wall of the fuselage.

Such surveillance systems have not turned out to be an optimal solution in terms of aerodynamic impact on the airplane and in terms of dimensional constraints, and this is for several reasons. Actually, the housing—once installed on the wall of the fuselage—projects by its structure relative to the profile of the fuselage, disturbing in a more or less significant manner the aerodynamic flow in this zone of the fuselage, and it thereby induces aerodynamic drag. So as to minimize the size of this housing, a recommended solution is to house within the fuselage a portion of the elements that do not need access to the outside, such as the batteries. Consequently, it is necessary to produce a housing within the fuselage, therefore requiring an intervention on the body of the airplane. This aerodynamic problem also imposes a constraint at the internal arrangement between the different components that constitute the surveillance system.

One solution that is adopted is to make the housing removable so as not to disturb the airplane during its flight and to reinstall it once the airplane is stopped. In this solution, it is necessary to provide wiring means between the housing and the elements that remain in the fuselage. In addition, it is also necessary to provide means for sealing the housing after the removal of the housing. Such means, when they are in the closed position, should also exhibit a profile that is in the extension of the wall of the fuselage. Such a removable housing makes its installation on the airplane relatively complex and can necessitate the presence of several operators.

SUMMARY OF THE INVENTION

In the invention, an attempt is made to provide an alternative to the installation of the surveillance system on the airplane, which makes it possible to eliminate the drawbacks cited above.

For this purpose, the invention proposes an assembly that comprises a surveillance device that is designed to be installed on a front landing gear of an aircraft by means of an attachment support, simple in its design and in its operating mode, making it possible to resolve the drawbacks of the prior art cited above while allowing a reliable attachment and securing the surveillance device on the outside of the airplane without impairing the integrity of the airplane under surveillance.

For this purpose, the invention relates to an attachment support for temporarily installing a piece of equipment on a wheel of a land vehicle or an aircraft, characterized in that it comprises:

Two support elements that are connected to one another by a shaft that together form a plane, whereby said elements are intended to rest respectively on the ground and against a tire of a wheel of said landing gear, with said elements extending along an axis parallel to the axis of the wheel, and Displacement means making it possible to place said elements in a first inactive position in which the two elements do not rest on the tire, and a second position called a locked position, in which the two elements rest on the tire so as lock the wheel, tangentially to said tire.

In this way, the equipment is made integral by means of the attachment support whose installation on the vehicle or the aircraft does not require providing a specific housing. In addition, this temporary installation is particularly advantageous within the framework of the use for an aircraft; actually, it makes it possible not to generate aerodynamic disturbances.

Advantageously, the mass of the airplane makes it possible to stabilize the equipment and to prevent the generation of vibrations that can trigger false alarms.

According to one embodiment of the invention, said means comprise an arm of the lever, whereby one end of said arm is connected to the end of one U-shaped element, whereby the two arms of said U-shaped element are mounted in a rotary manner respectively on the ends of one of the two support elements, said arm of the lever being designed to be moved from a horizontal position in which said arm of the lever extends parallel to the axis, toward a vertical position, driving the rotation of said U-shaped element from a position where said U-shaped element is in the same plane as said support elements in an inactive position toward a position where the base of said U-shaped element rests on the surface of the ground, thus raising said corresponding support element to place said support elements in a locked position.

According to one embodiment of the invention, said arm of the lever also constitutes a support element that is designed to accommodate said equipment.

Advantageously, said support elements that have a cylindrical shape comprise at least one portion of the support surfaces that are covered by an anti-skid material.

According to a preferred form of the invention, said wheel is one of the wheels of a front landing gear of an aircraft. Thus, in this way, the attachment support of the invention makes it possible to temporarily install the surveillance device on the aircraft while being completely independent of the aircraft.

According to one embodiment of the invention, said piece of equipment is a surveillance device that is designed to detect intrusions in a defined security zone around said aircraft.

The invention also relates to a device for locking the wheels of the landing gear of an aircraft while parked. According to the invention, said device comprises at least one attachment support as described above whose support elements are designed to rest respectively on the ground and against a tire of a wheel of said landing gear so as to block the forward motion of said wheel.

According to one embodiment, said landing gear is a front gear of said aircraft. However, in another embodiment, the locking device comprises three attachment supports; each of the supports is mounted, for example, on a wheel of a train for blocking the forward motion of said aircraft that is stopped.

The invention also relates to an assembly that comprises a surveillance device and an attachment support that is designed to be mounted on the wheel of a landing gear of an aircraft as described above. According to the invention, said surveillance device is mounted on the arm of the lever in a vertical position of said attachment support by means of a plate, whereby said support is mounted on said wheel of said gear in such a way that said device is offset relative to the strut of said gear, and Said surveillance device comprises an infrared detector assembly, an image sensor assembly, means for receiving and transmitting information, a storage memory, and a computer.

According to a preferred embodiment of the invention, said device also comprises means that can initialize a network of sensors placed in the aircraft and that can receive information sent by said sensors.

Preferably, said sensors are sensors of the open or closed state of the outside accesses of the airplane, such as the doors and the flaps. Each of the sensors that forms said network is equipped with a short-distance radio transmitter, a mechanical actuator, and an energy source such as a disposable battery.

According to one embodiment of the invention, said plate, on its lower portion, comprises an attachment element that is designed to be attached to the end of said arm of the lever in vertical position.

Advantageously, said arm of the lever, on at least one portion of the side of its free end, comprises a housing, whereby said housing is designed to accommodate a power source such as a battery to supply said surveillance device. In this way, the surveillance device is independent in terms of operation, which can go up to fifteen days, by way of example.

BRIEF DESCRIPTION OF THE DRAWING FIGURES

Figure 2:
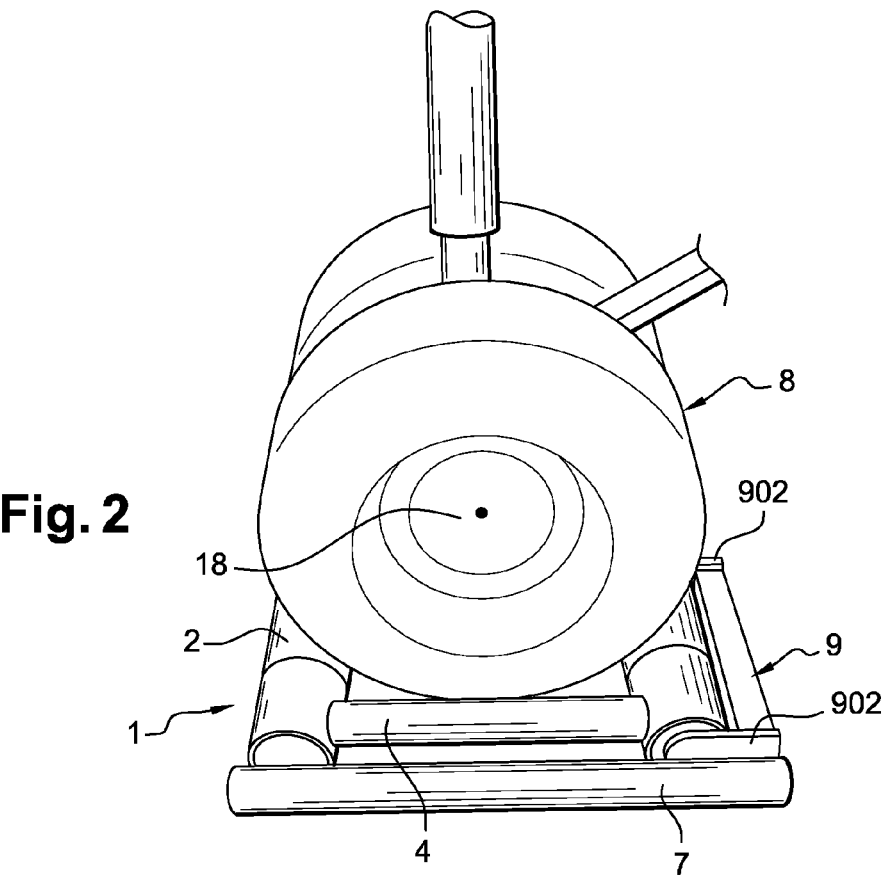
Figure 5:
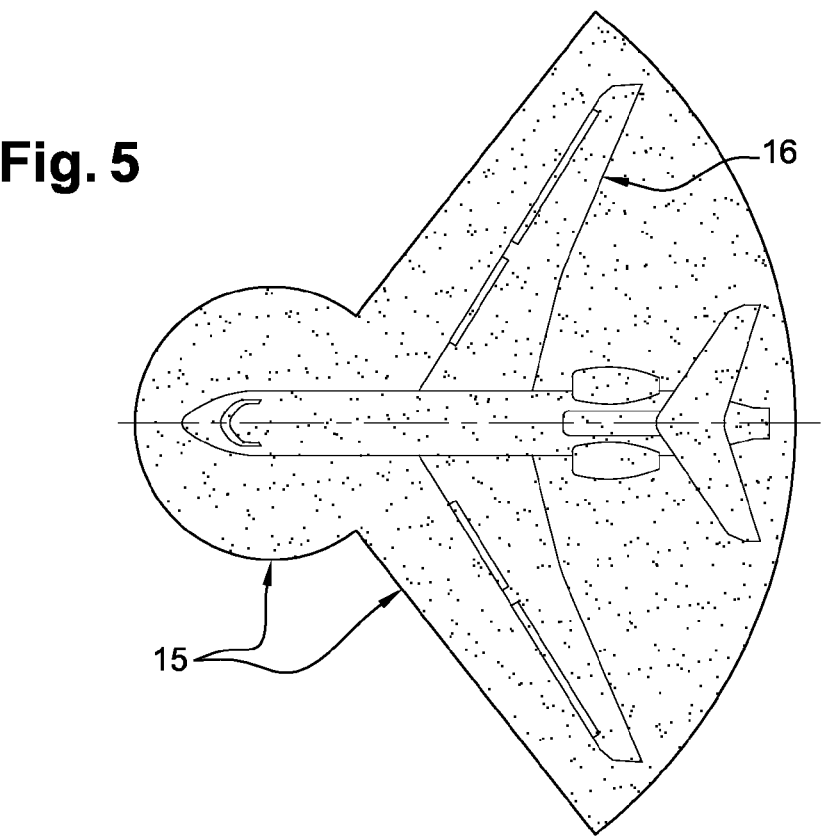
Figure 6:
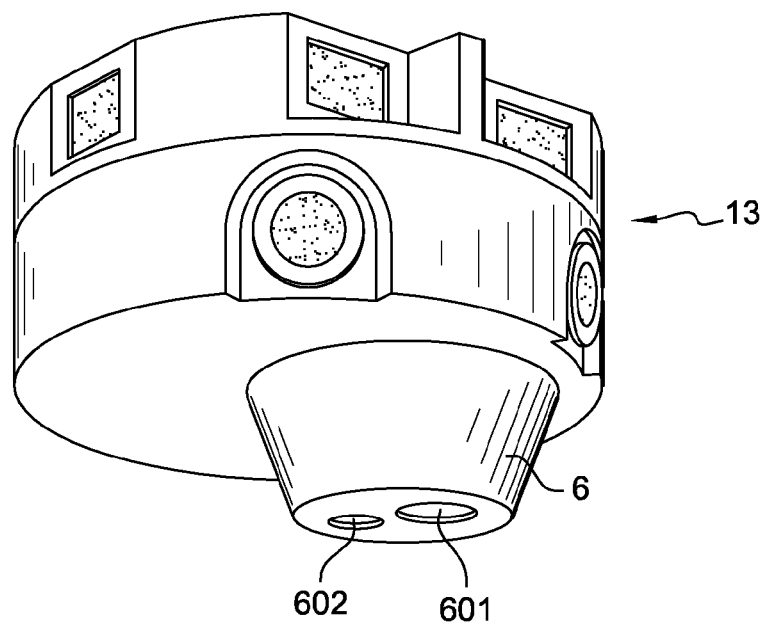

The invention will be described in more detail with reference to the accompanying drawings, in which:

FIG. 1 diagrammatically shows a front view of an assembly that comprises a surveillance device and an attachment support according to the invention, whereby the assembly is mounted on the wheel of the landing gear of an aircraft;

FIG. 2 diagrammatically shows the attachment support of FIG. 1 by itself in a so-called rest position;

FIG. 3 diagrammatically shows in profile the attachment support of FIG. 1 by itself in so-called locked position;

FIG. 4 shows a partially exploded and perspective view of the attachment support of FIG. 1;

FIG. 5 diagrammatically shows an example of a security zone defined by the surveillance device according to the invention around an aircraft such as a civilian airplane;

FIG. 6 diagrammatically shows a perspective view of the surveillance device.

DETAILED DESCRIPTION OF THE INVENTION

FIG. 1 shows an assembly comprising a piece of equipment 13 that is mounted on an attachment support 1 according to the invention. This assembly is designed to be installed temporarily on the landing gear 12 of an aircraft such as a civilian airplane, a military airplane, or a helicopter, more specifically on one of the wheels 8 of the front landing gear of an aircraft when the latter is on the ground and parked.

It is possible to provide other zones for attachment of said support relative to the airplane based on the nature of the equipment and its application, for example, to the landing gears located under the wing of the aircraft or located under the fuselage.

It is also possible to consider installing this attachment support on the wheel of a motor vehicle.

The attachment support comprises two support elements 2 that are connected to one another by a shaft 4. The two elements 2 form a plane with one another. The attachment support comprises displacement means 7, 9 that make it possible to place the two elements 2 in a first so-called rest position in which the two elements 2 do not rest on the tire of the wheel 8, and a second so-called stable locked position in which the two elements 2 rest on the tire so as to lock the wheel 8, tangentially to the tire. Stable, locked position is defined as a position in which the two elements are locked on the wheel, for example by locking means, such as keys that lock the activation of the displacement means. The removal of support elements relative to the wheel calls for an unlocking of these means. FIG. 1 shows the attachment support installed on the wheel in locked position in which a portion of the surfaces of the elements 2 rests respectively on the ground and against a tire of the wheel 8.

FIG. 2 and FIG. 3 illustrate in more detail respectively the attachment support 1 in its position called a rest position and in its second locked position.

Preferably, the two elements 2 have a cylindrical shape, each provided on the support surfaces against the ground and the tire of the anti-skid contact means 14. The anti-skid contact means 14 are, for example, anti-skid pads 14 that are designed to reduce the risks of undesired displacement of the attachment support on the ground. It is possible to provide anti-skid means in the form of sleeves covered by an anti-skid material that will envelop the support elements 2.

In a first position called a rest position, as shown in FIG. 2, the two elements 2 and the shaft form a U-shaped structure that is designed to be inserted into the wheel by the side, whereby the two elements 2 extend along an axis that is parallel to the axis of the wheel 8. The size of the U-shaped structure is adapted in such a way that the lower part of the wheel is contained entirely between the two elements.

The displacement means comprise an arm of lever 7 and a U-shaped element 9. The two arms 902 of the U-shaped element 9 are mounted in a rotary manner on the ends of one of the two support elements 2. In addition, one end of the arm of lever 7 is connected to the end of the U-shaped element 9. In the rest position of the attachment support, the arm of lever 7 extends parallel to the shaft 4, and the U-shaped element 9 extends parallel to the support elements 2; the arrangement is such that the assembly is contained in the same plane that is parallel to the plane of the ground.

In a second position called a stable locked position, as shown in FIG. 3, the arm of lever 7 is displaced for positioning in a vertical position relative to the plane of the ground. This displacement of the arm of the lever drives the rotation of the U-shaped element 9 from a position where the U-shaped element 9 is in the same plane as said support elements 2 to a position where the base 901 of said U-shaped element 9 is supported with the surface of the ground, thus raising the associated support element 2 to place the support elements 2 in a locked position.

Therefore, by its vertical position, the arm of lever 7 also constitutes a support element that is particularly suited for accommodating a piece of equipment 13 such as a surveillance device. Preferably, this surveillance device is a perimetric surveillance device, designed to detect intrusions in a security zone that is defined around an airplane 16 that is parked on the ground.

The invention therefore also relates to an assembly that comprises a surveillance device 13 and an attachment support 1 that is designed to be mounted on the wheel 8 of a front landing gear 12. The installation of the attachment support on the front landing gear of the airplane is actually the preferred form of the invention; actually, this location allows the surveillance device to scan the zones that are particularly sensitive for the security of the airplane such as the bottom of the wing where the engines are located, as well as the access zones of the landing gear located below the fuselage and the landing gear under the wing.

FIG. 1 illustrates such an installation of the attachment support on a landing gear.

The surveillance device 13 is mounted on the arm of lever 7 in a vertical position by means of a plate 6. Preferably, the arm of the lever or the support element 7 is arranged relative to the support elements 2 in such a way that the surveillance device is offset from the strut of the front gear, thus making it possible not to disturb the surveillance field of the surveillance device.

Furthermore, the longitudinal length of the arm is predefined in such a way that the installation of the surveillance device on the plate 6 is not disturbed by the flaps in open position (not shown in the figures). Preferably, the length of the arm of the lever is 40 cm.

According to the invention, the surveillance device 13, as shown in FIG. 6, comprises an infrared detector assembly, an image sensor assembly, means for receiving and transmitting information, a storage memory, and a computer. The zone under surveillance around the aircraft is defined by the arrangement between the detectors and the sensors.

FIG. 5 shows an example of the security zone 15 defined around the airplane according to a top view. This surveillance zone consists of a first surveillance zone that has a circular shape whose center of the circle is essentially the front landing gear of the airplane and a second surveillance zone that covers up to the end of the wings as well as the end of the tail of the aircraft. In such a way as to limit the surveillance gaps, coverage is provided between the two thus defined zones.

Advantageously, in combination with these perimetric surveillance means, the surveillance device 13 also comprises means that can initialize a network of sensors placed in the aircraft and that can receive information transmitted by said sensors. These sensors are sensors of the open or closed state of the outside accesses of the airplane, such as the doors and the flaps. These intrusion sensors are small, independent electronic assemblies that are each equipped with a short-distance radio transmitter and a mechanical actuator. The sensors are supplied by an independent energy source such as a disposable battery.

The presence of these sensors makes it possible to provide an additional level of security relative to the perimetric surveillance. Thus, an individual who would have been able to penetrate into the perimetric surveillance zone without being detected can be detected when he attempts to open a door or a flap. The change of state of the associated door is transmitted in the form of a message to the surveillance device, which simultaneously records it in its memory unit, and in turn retransmits it to the surveillance center.

The surveillance device comes in the form of a housing with a diameter of approximately 400 mm for a total weight of 5 to 7 kilos. It makes it possible to ensure a perimetric surveillance around the aircraft and under the aircraft including the landing gear, the zones of engines, and the wing. The internal components of the surveillance device therefore essentially comprise infrared detectors that can be parameterized in length and angle of detection, typically from 3 to 25 meters for a zone with a 90-degree angle. These detectors are installed at a height of 0.5 m relative to the ground. These detectors can operate at extreme temperatures, varying between −30° C. to 50° C. The infrared detection is associated with CCD-type video sensors that can produce night photographs. Of course, it is only necessary that the cameras operate continuously. The operation of the latter is triggered only after the detection of the sensor, either automatically or triggered only remotely by an operator if in doubt.

The surveillance device also comprises a memory unit that makes it possible to record all of the data collected when the aircraft is parked to constitute the flight log and a main computer that makes it possible to process the data in real time such as the processing of images. This computer also ensures the management of the assembly of electronic components.

The protocol for transmitting messages to the surveillance center and to the user is done in a known manner. The information (images, videos, and alarm) is stored in the memory unit that has a large recording capacity. Simultaneously, the surveillance device calls a secure server via a satellite network where all of the information relative to the client is stored. The HTML interface of the server allows the client (pilot of the airplane, owner, technical service) an instantaneous consultation. This server retransmits all of the alarms in SMS, MMS or email mode, providing notification of the date and time of the alarm, as well as the associated video image.

The transmission of messages from the surveillance device to the server is ensured both by a wireless telephone network and by the satellite network. This double telecommunications system makes it possible to ensure a transmission in the case of malfunction of one of the two transmission modes. The wireless telephone network is also used for receiving orders directly from the server and resolving doubts via videos controlled by operators.

According to FIG. 4, the arm of the lever or support element 7, which is preferably made of aluminum, comprises an attachment plate 6 that is designed to accommodate the surveillance device 13. On its lower part, the plate 6 comprises an attachment element 10 that is designed to be attached to the end of the arm of lever 7 that is first placed in vertical position.

The attachment of the surveillance device relative to the plate can be done in a known manner, in particular by screwing.

In another preferred form of the invention, the attachment support not having provided the attachment plate, the housing of the surveillance device directly comprises a lower end 6 that is attached to the end of the support element. According to FIG. 6, this end 6 is equipped with an attachment housing 601 that is designed to accommodate one end of the arm 7, and it is also provided with a locking means 602 that makes it possible to lock the removal of the housing relative to the attachment support.

Advantageously, the arm of lever 7 comprises a housing on at least one portion of the side of its free end. The free end is defined as the end that is not connected to the U-shaped element 9 that constitutes a base with the support elements 2. This housing 17 is particularly suitable for accommodating a supply source 11 such as a battery for supplying said surveillance device 13. Preferably, the battery block is accessible either by removing the plate 6 or by removing a movable portion of the arm of the lever, for example. It is possible to provide an indicator of the state of the charge of the battery so as to be able to initiate recharging when the assembly is not in service.

Thus, the surveillance device is entirely independent of the aircraft electrically and physically. It cannot interfere with the operation of the other elements of the aircraft because it is installed only on the aircraft when the latter is parked; consequently, the surveillance device no longer generates the problem of aerodynamic disturbances. Thereby, there is no longer a size constraint for designing the surveillance device. In addition, its installation no longer requires providing a specific receiving structure within the fuselage of the airplane or in another zone of the airplane because the attachment support makes it possible to temporarily make the surveillance device integral on the airplane. The installation and removal of the assembly are very simple due to the use of the arm of the lever.

Preferably, to take into account the severe environment of the zone in which the surveillance device is often installed, the housing in which the different electronic components that constitute the device are installed is defined in such a way as to be able to operate at extreme temperatures, optionally provided with lightning protection.

According to the invention, the attachment support 1 can also be used by itself as a locking device for locking a wheel of an aircraft while parked. Such a locking device makes it possible to stabilize the airplane on a tarmac by preventing any possible movement or sliding of the airplane on the ground.

The known blocks for aircraft are not completely satisfactory. They cannot be easily manipulated. They generally consist of a tubular piece. Actually, once placed on the ground and arranged opposite the wheels to be locked, the blocks are partially crushed under the wheels under the effect of the mass of the airplane. Also, it is no longer possible to remove the blocks; often, it is necessary to move the airplane back to release the blocks.

The locking device of the invention allows an easier manipulation by having two support elements 2 that are connected to one another by a shaft 4. One of the two elements is movable relative to the second element by means of an arm of lever 7, in such a way as to place the two elements in a support position against the tire of the wheel. Thus, the support elements 2 of the locking device are placed in so-called rest position on the lower portion of the wheel of the landing gear, whereby the elements extend along an axis that is parallel to the axis of the wheel. The placement is done by the side of the wheel, and at this time, the support elements 2 are also not in contact with the wheel. The support elements 2 are entirely free in their displacement relative to the wheel. Then, the arm of lever 7 is raised toward a vertical position relative to the ground, so that the elements rest against the wheel and the lock. When it is desired to remove the locking device, it is enough to displace the arm of lever 7 toward its initial position, which then extends parallel to the shaft 4.

In a general manner, a landing gear comprises two wheels that are located in the same plane. To block the forward motion of the airplane by the locking device of the invention, it may be advantageous to use a locking device on each of the wheels.

The invention claimed is:

1. An attachment support for temporarily installing a piece of equipment on a wheel of an aircraft or a vehicle, the attachment support comprising:
   two support elements that are connected to one another by a shaft that together form a plane, whereby said support elements are intended to rest respectively on the ground and against a tire of said wheel, with said support elements extending along an axis parallel to the axis of the wheel; and displacement means comprising a U-shaped element with a base and two arms and an arm of lever connected an arm of said U-shaped element by one end, said displacement means being configured to place said support elements in a first inactive position in which the two support elements do not rest on the tire, and a second position called a locked position, in which the two support elements rest on the tire so as to lock the wheel, tangentially to said tire, whereby the two arms of said U-shaped element are mounted in a rotary manner respectively on the ends of one of the two support elements, said arm of lever being designed to be displaced from a horizontal position, in which said arm of lever extends parallel to the shaft, toward a vertical position, driving the rotation of said U-shaped element from a position where said U-shaped element is in the same plane as said support elements in an inactive position toward a position where the base of said U-shaped element rests on a surface of the ground, thus raising said corresponding support element to place said support elements in the locked position.

2. The attachment support according to claim 1, wherein said arm of lever also constitutes a support element that is designed to accommodate said piece of equipment.

3. The attachment support according to claim 2, wherein said support elements that have a cylindrical shape comprise at least one portion of the support surfaces that are covered by an anti-skid material.

4. The attachment support according to claim 1, wherein the attachment support is configured to install said piece of equipment on one of the wheels of a landing gear of an aircraft.

5. The attachment support according to claim 4, wherein said piece of equipment is a surveillance device that is designed to detect intrusions in a security zone that is defined around said aircraft.

6. The attachment support according to claim 4, wherein said arm of lever also constitutes a support element configured to accommodate a surveillance device to detect intrusions in a security zone around said aircraft.

7. The attachment support according to claim 1, wherein said support elements that have a cylindrical shape comprise at least one portion of the support surfaces that are covered by an anti-skid material.

8. An assembly comprising:
a surveillance device; and
the attachment support designed to be mounted on a wheel of an aircraft landing gear according to claim 1,
wherein said surveillance device is mounted on the arm of a lever in a vertical position of said attachment support by a plate when said arm of lever is in the vertical position, whereby said support is mounted on said wheel of said gear in such a way that said surveillance device is offset relative to a strut of said gear, and
said surveillance device comprises an infrared detector assembly, an image sensor assembly, means for receiving and transmitting information, a storage memory, and a computer.

9. The assembly according to claim 8, wherein said surveillance device comprises means for initializing a sensor network placed in the aircraft and for receiving information transmitted by said sensors.

10. The assembly according to claim 9, wherein said sensors are sensors of an open or closed state of outside accesses of the airplane, the doors of the airplane or the flaps of the airplane.

11. The assembly according to claim 9, wherein each of the sensors that forms said network is equipped with a short-distance radio transmitter, a mechanical actuator, and an energy source or a disposable battery.

12. The assembly according to claim 8, wherein on its lower portion, said surveillance device comprises an attachment end that is designed to be attached to the corresponding end of said arm of lever in vertical position.

13. according to claim 12, wherein said arm of lever comprises a housing on at least one portion of the side of its free end,
whereby said housing is designed to accommodate a supply source or a battery for supplying said surveillance device.

14. The assembly according to claim 8, wherein each of the sensors that forms said network is equipped with a short-distance radio transmitter, a mechanical actuator, an energy source or a disposable battery.

15. A method for locking the wheels of landing gear of an aircraft while parked with an attachment support,:
positioning support elements of the attachment support such that the support elements rest respectively on the ground and against a tire of a wheel of at least one landing gear so as to block a forward motion of said aircraft, the support elements being connected to one another by a shaft that together form a plane, whereby said support elements are intended to rest respectively on the ground and against a tire of said wheel, with said support elements extending along an axis parallel to the axis of the wheel,
wherein displacement means comprising a U-shaped element with a base and two arms and an arm of lever connected an arm of said U-shaped element by one end is configured to place said support elements from a first inactive position in which the two support elements do not rest on the tire to a second position called a locked position, in which the two support elements rest on the tire so as to lock the wheel, tangentially to said tire,
whereby the two arms of said U-shaped element are mounted in a rotary manner respectively on the ends of one of the two support elements, said arm of lever being designed to be displaced from a horizontal position, in which said arm of lever extends parallel to the shaft, toward a vertical position, driving the rotation of said U-shaped element from a position where said U-shaped element is in the same plane as said support elements in an inactive position toward a position where the base of said U-shaped element rests on a surface of the ground, thus raising said corresponding support element to place said support elements in the locked position.

16. The method according to claim 15, wherein the support elements are positioned in such a way so as to rest respectively on the ground and against a front landing gear of said aircraft.

* * * * *